United States Patent [19]
Hervert

[11] 3,956,614
[45] May 11, 1976

[54] ELECTRIC CURRENT DISTRIBUTION MEANS FOR A CERAMIC TYPE OF ELECTRICAL RESISTANCE HEATER ELEMENT

[75] Inventor: George L. Hervert, Woodstock, Ill.

[73] Assignee: Universal Oil Products Company, Des Plaines, Ill.

[22] Filed: Apr. 21, 1975

[21] Appl. No.: 570,323

[52] U.S. Cl. .............................. 219/541; 219/538; 338/312; 338/316; 338/331; 338/333
[51] Int. Cl.² .......................................... H05B 3/08
[58] Field of Search ........... 219/374, 375, 381, 540, 219/541, 538, 548; 338/312, 315–317, 321, 322, 331, 333, 334

[56] References Cited
UNITED STATES PATENTS
3,105,136  9/1963  Ashenfarb .................... 219/543 X
3,163,841  12/1964  Willett ......................... 219/543 X Primary Examiner—C. L. Albritton
Attorney, Agent, or Firm—James R. Hoatson, Jr.; Philip T. Liggett; William H. Page, II

[57] ABSTRACT

A metal bar with a metal felt covering on each side or therearound and sized externally to be a snug slip fit into slot means provided in a conductive surface monolithic refractory ceramic heater element provide for a convenient and desirable means for distributing current to the conductive surface of the element. As the felt covered electrode means heats up with electric current input to the element and under heat generating conditions, there will be a still tighter bond between the metal felt surfaces of the electrode and the slotted opening in the ceramic element to result in the desired tight contact and an efficient current distribution therefrom.

8 Claims, 3 Drawing Figures

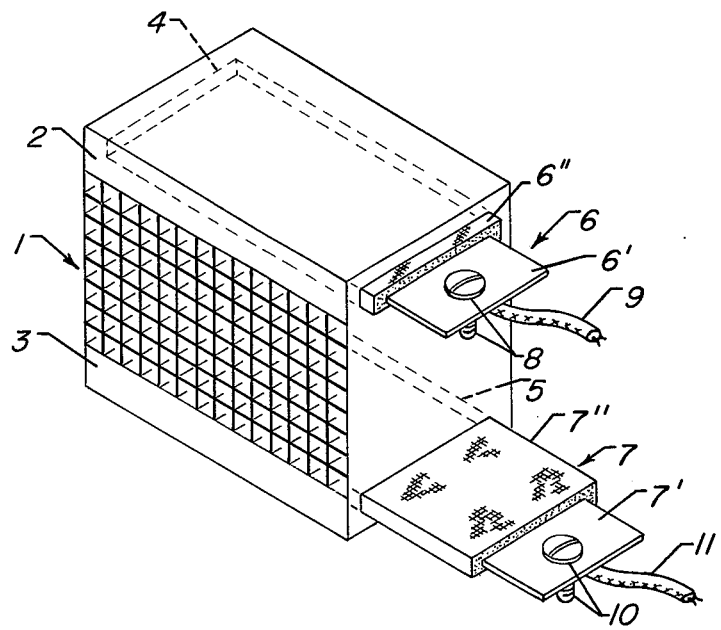
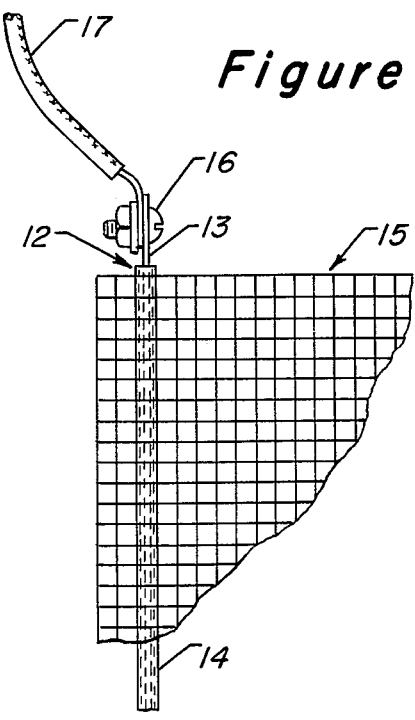
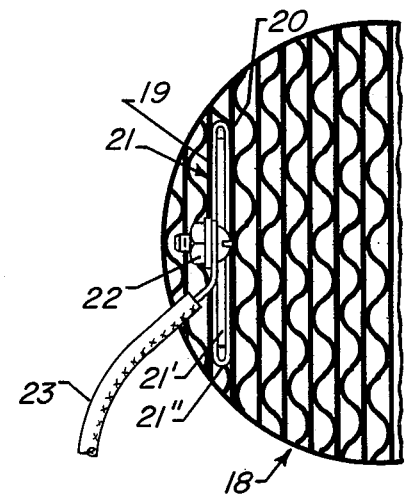

ELECTRIC CURRENT DISTRIBUTION MEANS FOR A CERAMIC TYPE OF ELECTRICAL RESISTANCE HEATER ELEMENT

The present invention relates to providing an efficient and desirable type of current distributing electrode means for use with monolithic ceramic types of conductive surface resistance heater elements.

More particularly, the present invention is directed to the utilization of elongated metal plates or bars which have metal felt coverings as electrode means that are, in turn, sized and adapted for insertion into spaced elongated slots or openings that are provided along opposing side portions of a conductive surface ceramic type of heater element to effect current distribution to such surface.

It is, of course, understood and realized that there are many forms of electrical heating devices and many types of resistance heating elements suitable for producing a radiant heat output; however, there are believed to be relatively few monolithic ceramic types of heater elements where a semiconductive surface for such element can provide for electrical resistance radiant heating. Generally, heater elements, or heat panels, make use of metal sheets, bars, wires, or metal coated members, to provide for resistance heating or, alternatively, there will be panels or shaped heaters which will employ embedded wiring in the manner of electrically heated blankets and the like. There has also been the use of carbon and graphite particles on ceramics and other non-conductive support members for small resistors, etc., as well as the use of carbon "inks" as part of the "thick film" technology in producing resistors and semiconductor components; however, again, it is not believed that such materials have been widely used in producing ceramic heater elements.

In connection with the present invention, it may be considered a principal object to provide for an improved form of current distributing electrode adapted for use in a suitably sized elongated slot means in a monolith type of heater element in order to easily mount the electrode and efficiently effect the necessary distribution of electric current to a semiconductive surface for such element.

Actually, it may also be considered an object of the present invention to provide for a non-bolting or non-clamping means of attaching an electrode to a ceramic heater member by utilizing an insertion arrangement where the electrode means will expand and self-tighten itself within the slot means from resulting resistance heat generation when the current is turned on for the heater element.

As still another object, the electrodes of the present invention are fabricated from readily available materials, i.e. metal strips or bars and from metal felts or pads. Preferably, the metals will be those which do not readily corrode or oxidize and which might otherwise cause oxidation films to reduce the desired electric current flow.

In order to provide a high surface area heater element, it is generally preferred to utilize a honeycomb type of ceramic substrate, or at least a ribbed or finned structure where there will be a large ratio of surface area per unit volume of the particular element. Actually, a honeycomb type of heater element can be of advantage in providing for a large area of heat exchange surface to, in turn, effect rapid and efficient heat transfer to a gaseous or liquid media that is passed through the multiplicity of channels of the element. It is, however, not intended to limit the present invention to any one type, or shape, of rigid ceramic substrate nor to any one type of semiconductive coating, or to any one composite of conductive material with a non-conductive ceramic to provide a surface which can produce radiant electrical resistance heating in combination with the improved type of electrode means and the method of mounting such means with the rigid element.

In a broad aspect, the present invention provides in combination with a monolithic refractory ceramic type of electrical resistance heater element where conductivity is imparted to the heat radiating surface thereof by the compositing of a conductive material, the improved electric current distributing means for the element, which comprises, providing elongated slot openings along spaced opposing portions of said refractory element, and further providing slidably insertable electrode members for said spaced openings to provide for electrical resistance heating across the width of the element, with each such electrode member having an outer covering of metal felt over a metal core member which is, in turn, provided with a terminal means for a current supplying lead wire, and with the external size and shape of the metal felt covering being such as to effect a slip fit into a spaced opening when there is no current flow, whereby upon electric current flow for heat producing operations there is an expansion of each of the electrode members to result in tight and efficient electrical contacts with the conductive surfaces of the element.

Various types of metal felts or gauzes may be utilized to advantage to provide the electrode construction; however, preferably each of the electrodes will use a substantially non-corrosive type of metal core member and non-corrosive type of metal felt. For example, the metals may comprise any one of the various of the stainless steel alloys which is high in nickel or chromium, or combinations thereof, such as Types 304, 309, 310, 316, etc., or the nickel based alloys such as Incoloy, Inconel, Hastelloy B and C, etc. Preferably, metals which are primarily of copper, aluminum, or other readily corrosive metal will not be used, nor will the stainless steel alloys which have a high percentage of copper. The metal felt material can be used in a manner to entirely encompass a flat metal sheet or bar as a core member or, alternatively, the metal felt may merely be placed each side of a relatively wide core member. Where desired, the metal felts may be spot welded, riveted or otherwise attached to the core portion at spaced points in order that there will be a relatively tight attachment of the two components of the electrode member for handling purposes. Where rivets are utilized, they should, of course, be counter-sunk to prevent any interference with the insertion of the electrode member into the slot portion of the ceramic substrate.

The rigid monolithic ceramic element which will have an electrically heat radiating surface prepared in a manner to have a suitably conductive or semiconductive surface can be prepared in a manner to have a coating on a non-conductive ceramic substrate or, as will be explained in more detail hereinafter, the entire rigid ceramic substrate material may incorporate a filler of conductive or semiconductive particles in order that the resulting mix is of a semiconductive nature to provide the desired electrical resistance heating from the surface of the substrate. Where a surface or composite coating is provided for a rigid, refractory substrate of primarily crystalline material, the semiconductive layer will preferably be of a carbonaceous pyropolymer which results from the heating of an organic pyrolyzable substance in a primarily nonoxidizing atmosphere and in contact with the substrate surface at a temperature above about 400° C. A carbonaceous pyropolymer of this nature may be prepared in accordance with the teachings of U.S. Pat. No. 3,651,386, which method of preparation generally provides a conductivity of from about $10^{-8}$ to about $10^{-2}$ inverse ohm-centimeters for the pyropolymer.

As an alternative form of semiconductive rigid substrate, there may be the compositing of a suitable conductive powdered carbon, graphite, or carbonaceous pyropolymer into admixture with a refractory, inorganic oxide crystalline material. Preferably, the powdered conductive material will be of the type prepared in accordance with the teachings of the aforementioned U.S. Pat. No. 3,651,386, where there is a resulting pyropolymer on high surface area particles and such particles used are a controlled quantity to mix with any one of the various silica-alumina, magnesium silicates, petalite, spodumene, cordierite, mullite, etc., types of materials in the formation of a suitably extended surface area type of heating member. Actually, any known sinterable ceramic material suitable for making a honeycomb or other extended surface area substrate form may be utilized and sufficient conductive material is combined with the cyrstalline materials in order to effect a desired resulting conductivity for a finished substrate as a heater element.

As heretofore noted, a preferred heater element will have a high exposed surface area in order to, in turn, provide a high quantity of radiant heat per unit volume of the heater element. A honeycomb form of element may be prepared from a suitable mix by an extrusion type of preparation or, alternatively, it may be formed in a green state to have desired sized openings and opening configurations. The pulverized ceramic material, carbonaceous pyropolymer and binder can be deposited on flexible supporting sheet members providing a particular pattern of openings to, in turn, produce a unitary sized structure. Such methods of manufacture are well known to those familiar with the ceramic arts and it is not deemed necessary to elaborate on the various methods of preparation of a rigid ceramic honeycomb in connection with the present invention.

Although preferred forms of rigid ceramic type heater elements will incorporate or composite a semiconductive surface of a carbonaceous pyropolymer formed from the deposition of a pyrolyzable substance, it is to be understood that still other types of semiconductive materials or surfaces may be provided and utilized within the scope of the present invention. For instance, an electrically conductive film may be provided by the vacuum evaporation of metal, or by the decomposition of a metal carbonyl onto the surface of the ceramic substrate, or still further, there may also be the use of a film formed by the chemical deposition of a metal from a solution containing the salt of the desired metal. For example, films may be formed from nickel, chromium, molybdenum, and the like. Also metals can be included in ceramic mix in an amount sufficient to provide a desired conductivity.

It is also to be noted that various procedures may be utilized in forming and placing the slot means for the insertion of the metal electrode members. For example, in combination with a honeycomb type of member, there may be added opposing portions for the ceramic substrate which are substantially free of longitudinal cell or passageways so as to provide suitable space for the molding, cutting or otherwise forming of elongated slots to structurally accommodate the metal felt surfaced electrode members. Alternatively, there may be slot means provided to cut across a plurality of open cell portions of the honeycomb member or extend longitudinally into a zone normally occupied by a plurality of cells. In all cases, however, there shall be suitably prepared conductive surfaces for each of the slot openings in order to effect the distribution of the electrical current from such surfaces into the remaining conductive surfaces for the entire heater element.

The electric current distributing means for a ceramic type of heater element in accordance with the present invention may be better understood as to electrode construction, as well as with respect to variations in effecting their mounting into a particular element, by reference to the accompanying drawing and the following description thereof.

FIG. 1 of the drawing is a diagrammatic isometric view indicating a rectangular honeycomb form of ceramic heater element showing spaced insertable electrode members which, in turn, utilize metal felt facings for contact with the conductive surface of the element.

FIG. 2 of the drawing is a partial elevational view indicating how an electrode member may be inserted into a slot means which is formed to pass transversely through a plurality of longitudinal cells of a honeycomb member.

FIG. 3 of the drawing indicates diagrammatically in a partial elevational view how an elongated electrode member may be inserted into a slotted opening which is parallel with and formed from longitudinal portions of adjacent honeycomb passageways.

Referring now particularly to FIG. 1 of the drawing, there is indicated a rectangular form of rigid ceramic honeycomb having a central portion 1 with a multiplicity of square or rectangular form cells. There is also indicated the formation of upper and lower ceramic sections 2 and 3 which have not been provided with the longitudinal honeycomb type passageways and are of a substantial solid construction except for transverse elongated slots indicated at 4 and 5 which, in turn, have been provided to accommodate the respective upper and lower electrode members 6 and 7.

In accordance with the present invention, each electrode member will comprise an inner metal bar or sheet member, such as 6' and 7', and each with an end bolt or other terminal means for the attachment of a current distributing wire. Each member will also have a suitable metal fett covering, such as shown at 6" and 7", which will, in turn, transfer the electrical energy to the surface of the respective slots and thence to the conductive surfaces of the entire heater element. The metal felt coverings may entirely encompass core portions; however, where the electrodes are of a relatively wide and thin metal, then the felt may merely be applied to the wide face portions of each and need not continue around the narrow edge portions. Also, as heretofore noted, where desired, the respective felt coverings may be bolted, spot welded, or otherwise attached to the core members such that there are at least spaced points of fixed attachment. Still further, as heretofore noted, the metal core members and the metal felts material may comprise various non-corrosive types of metals or metal alloys and it is not intended to limit the present invention to the use of any one metal or any one alloy.

The present drawing indicates the utilization of a bolt means 8 on electrode 6 to effect the attachment for the end of a current distributing wire 9 while similar bolt means 10 at the end of the electrode means 7 is utilized to effect a connection to the current supplying wire 11. This method of attachment is diagrammatic and it is to be understood that welding or other bolting or clamping types of attachment may be utilized between core members and the electric current supply wires.

In each instance, the size of the core members for each electrode and the thickness of the felt materials at 6'' and 7'' will be correlated with the internal dimensions for each of the respective slot portions 4 and 5 in the ceramic heater element 1 such that the room temperature electrode members can be snuggly fit into the respective slots to make contact with the side wall portions thereof. Thus, when electrical energy is supplied to the ceramic element through the respective electrode members, there will be a resulting heating of such electrodes to result in temperature enlargements for each of the core members at a much greater rate than for the ceramic member by reason of higher coefficients of expansion for the metals to effect a tightened contact between the electrodes and the slot surfaces to, in turn, provide an efficient current distribution from the latter to the conductive surfaces for the heater element.

Referring now to FIG. 2 of the drawing, there is shown an electrode member which will have a construction similar to that indicated at 6 and 7 with a non-corrosive, highly conductive metal bar or sheet member 13 being covered with a suitable metal felt 14, in turn having a thickness which will provide a snug insertable fit within a suitably sized slot means being provided down through a honeycomb element 15. In other words, a suitable slot for the metal felt covered electrode member 12 will be formed by cutting through a plurality of longitudinal honeycomb cells for the element 15 and the exterior faces for felt covering 14 will become in contact with the side wall portions of the particular longitudinal cells which will have been transversely cut or otherwise eliminated to provide slot means for the electrode 12. An upper end portion of the core member 13 is indicated as being provided with suitable bolt means 16 to, in turn, hold and clamp the end of an electric current supply wire 17.

In accordance with the present invention, a snug sliding fit for the electrode 12 insertion into the honeycomb member 15 at respective opposing slotted portions will provide for the desired tightened and efficient current distribution into the conductive surfaces of the electrical resistance element 15 as current is supplied to the unit and there is the resultant temperature rise and thermal expansion of each of the electrode members within the respective slot portions of the ceramic member.

In FIG. 3 of the drawing, there is indicated a modified form of rigid ceramic element where the longitudinal "honeycomb" openings through the element are provided from the alternating of wave-form or corrugated partitioning members between spaced relatively flat partitioning members. There is also indicated the placement of an electrode means 21 longitudinally into the element, between flat portions such as 19 and 20, such that there can be current distribution to the total conductive surface of the element 18. The electrode 21 again comprises a core portion 21' and a metal felt covering portion 21'', with the construction being similar to that shown in FIGS. 1 and 2 and the overall thickness being of a dimension to be compatible with the internal spacing between flat honeycomb portions 19 and 20 whereby there will be a resulting sliding fit for the insertion of the entire electrode 21 longitudinally into the interior of the honeycomb member 18. Also, as heretofore noted, with a heating-up operation of the electrical resistance heater device, there will be the resulting tightened snug fit of the entire electrode within the honeycomb element so as to effect the desired efficient electric current distribution from the electrode means 21 into the conductive surface of the semiconductive element 18. In this embodiment, there is shown a bolt means 22 providing for the clamping attachment of electric supply wire 23 to the core member 21'.

In connection with both FIGS. 2 and 3 of the drawing, (though not shown), it is to be understood that a similar spaced and opposing electrode means will be provided for the respective opposite side portions of each ceramic element such that there will be the buildup of electrical resistance heating from each element and resulting radiant heat provided from their various conductive surfaces. It is also to be understood that each of the figures are diagrammatic and that suitable housings or heater casing means may be provided for each of the heater devices in order to direct or control the radiant heat energy therefrom. The housings may also be made to accommodate suitable fan means for effecting an air flow through a honeycomb element and for producing a heated air stream. While each of the illustrated embodiments are of a honeycomb construction, it is noted that it is within the scope of the present invention to provide corrugated bars, extended surface area plates, etc., which, in turn, can be provided with opposing slot means which will accommodate felt covered electrode means and effect a desired electrical current distributing means in accordance with the teachings of the present invention, and it is not intended to limit an improved form of monolithic ceramic heater means to any one type of ceramic substrate nor substrate configuration.

I claim as my invention:

1. In combination with a monolithic refractory ceramic type of electrical resistance heater element where conductivity is imparted to the heat radiating surface thereof by the compositing of a semiconductive material, having a conductivity of from about $10^{-8}$ to about $10^2$ inverse ohm-centimeters the improved electric current distributing means for an element, which comprises, elongated slot openings along spaced opposing portions of said refractory element, and slidably insertable electrode members for said spaced openings to provide for electrical resistance heating across the width of the element, with each such electrode member having an outer covering of metal felt over a metal core member which is, in turn, provided with a terminal means for a current supplying lead wire, and with the external size and shape of the metal felt covering being such as to effect a slip fit into a spaced opening when there is no current flow, whereby upon electric current flow for heat producing operations there is an expansion of each of the electrode members to result in tight and efficient electrical contacts with the conductive surfaces of the element.

2. The heater element of claim 1 further characterized in that the semiconductive material providing for electrical resistance heating comprises a carbonaceous pyropolymer composited with the surface of a non-conductive rigid substrate of primarily crystalline material and that such pyropolymer was formed from the heating of an organic pyrolyzable substance in a primarily non-oxidizing atmosphere in contact with the substrate surface at a temperature above about 400°C.

3. The heater element of claim 1 further characterized in that said element is made semiconductive from incorporating with sinterable ceramic material semiconductive subdivided particles in turn formed from a coating of carbonaceous pyropolymer on refractory inorganic oxide particulates by heating an organic pyrolyzable substance in a primarily non-oxidizing atmosphere in contact with the particles at a temperature above about 400° C.

4. The heater element of claim 1 further characterized in that the metal felt provided over the core member is of an electrically conductive alloy comprising nickel, chromium and iron.

5. The heater element of claim 1 further characterized in that the core member is of an electrically conductive alloy comprising nickel, chromium and iron.

6. The heater element of claim 1 further characterized in that said element has at least a central portion which is of a honeycomb configuration with a multiplicity of longitudinal passageways therethrough in order to permit the passage of a fluid stream in heat exchange with the radiant heat producing surfaces of the element.

7. The heater element of claim 6 still further characterized in that the elongated slotted openings in opposing portions of the refractory element are provided through substantially solid ceramic portions without longitudinal honeycomb passageways.

8. The heater element of claim 6 still further characterized in that said elongated slotted openings for the current distributing means are provided in alignment with and through portions of the elongated honeycomb passageways of the element at opposing side portions thereof.

* * * * *